United States Patent [19]
Aonuma et al.

[11] 4,063,000
[45] Dec. 13, 1977

[54] PROCESS FOR PRODUCTION OF FERROMAGNETIC POWDER

[75] Inventors: Masashi Aonuma; Hiroshi Ogawa; Yasuo Tamai, all of Odawara, Japan

[73] Assignee: Fuji Photo Film Co., Ltd., Minami-ashigara, Japan

[21] Appl. No.: 614,274

[22] Filed: Sept. 17, 1975

[30] Foreign Application Priority Data

Sept. 17, 1974 Japan .................................. 49-106901

[51] Int. Cl.$^2$ ............................................... H01F 1/02
[52] U.S. Cl. .................................... 428/403; 428/900; 427/127; 427/216; 252/62.55; 75/.5 AA; 148/105
[58] Field of Search ................ 428/900, 403; 427/127, 427/216; 252/62.55; 75/.5 AA; 148/105

[56] References Cited

U.S. PATENT DOCUMENTS

| 3,139,354 | 6/1964 | Wolfe .................................... 428/900 |
| 3,567,525 | 3/1971 | Graham et al. .................... 75/.5 AA |
| 3,663,318 | 5/1972 | Little et al. ......................... 75/.5 AA |
| 3,756,866 | 9/1973 | Parker et al. ....................... 75/.5 AA |

FOREIGN PATENT DOCUMENTS

| 444,470 | 5/1965 | Japan .................................... 427/127 |
| 43-20,116 | 8/1968 | Japan ............................... 252/62.55 |
| 45-14,934 | 5/1970 | Japan ............................... 252/62.55 |

Primary Examiner—Ralph S. Kendall
Attorney, Agent, or Firm—Sughrue, Rothwell, Mion, Zinn and Macpeak

[57] ABSTRACT

A process for producing a ferromagnetic metal powder comprising treating a ferromagnetic metal powder produced by a solution reduction process with an aqueous solution containing at least one anionic surface active agent.

14 Claims, No Drawings

PROCESS FOR PRODUCTION OF FERROMAGNETIC POWDER

BACKGROUND OF THE INVENTION

1. Field of the Invention

The present invention relates to a process for the production of a ferromagnetic metal powder. More particularly, the present invention relates to a process for producing a ferromagnetic metal powder for a magnetic recording member suitable for high density recording.

2. Description of the Prior Art

Ferromagnetic powders hitherto used in magnetic recording members are maghemite ($\gamma$-$Fe_2O_3$), Co-doped maghemite, magnetite ($Fe_3O_4$), Co-doped magnetite, a Berthollide compound of maghemite and magnetite ($FeO_x$, $1.33 < x < 1.50$), a Co-doped Berthollide compound of maghemite and magnetite, chromium dioxide ($CrO_2$), and the like. These ferromagnetic powders, however, had insufficient magnetic properties such as coercive force (Hc), maximum residual magnetic flux density (Br), and the like when used in the so-called high density recording. They are, therefore, not suitable for magnetic recording in which signals of a short wave length about 10 $\mu$m or less) are recorded.

Recently, investigations on ferromagnetic powders having properties suitable for high density recording have been widely conducted. One example of these ferromagnetic powders which have been investigated is a ferromagnetic metal powder.

The following methods of producing ferromagnetic metal powders are known.

1. A method comprising heat-decomposing an organic acid salt of a metal capable of forming a ferromagnetic material, for example, an oxalate, and then reducing with a reducing gas. This method is described in, for example, Japanese patent publication Nos. 11412/1961, 22230/1961, 14809/1963, 3807/1964, 8026/1965, 8027/1965, 15167/1965, 12096/1966, 24032/1967, 3221/1968, 22394/1968, 29268/1968, 4471/1969, 27942/1969, 38755/1971, 38417/1972, 41158/1972, 29280/1973, and U. S. Pats. 3,186,829, and 3,190,748.

2. A method comprising reducing a needle-like iron oxide derived from an oxyhydroxide of iron, or a needle-like oxyhydroxide of iron, or a substance containing metals other than iron as well as the above oxyhydroxide. This method is described in, for example, Japanese patent publication Nos. 3862/1960, 11520/1962, 20335/1964, 20939/1964, 24833/1971, 29706/1972, 39477/1972, 24952/1973, Japanese patent application OPI Nos. 5057/1971, 7153/1971, 79153/1973, 82395/1973, and U.S. Pat. Nos. 3,598,568, 3,607,220, and 3,702,270.

3. A method comprising evaporating a ferromagnetic metal in a low pressure inert gas. This method is described in, for example, Japanese patent publication Nos. 25620/1971, 4131/1972, 27718/1972, and Japanese patent application (OPI) Nos. 25662/1973 through 25665/1973, 31166/1973, 55400/1973, and 81092/1973.

4. A method comprising heat-decomposing a metal carbonyl compound. This method is described in, for example, Japanese patent publication Nos. 1004/1964, 3415/1965, 16868/1970, and U.S. Pat. Nos. 2,983,997, 3,172,776, 3,200,007, and 3,288,882.

5. A method comprising electrodepositing a ferromagnetic metal powder using a mercury cathode, and then separating the metal powder from mercury. This method is described in, for example, Japanese patent publication Nos. 12910/1960, 3860/1961, 5513/1961, 787/1964, 15525/1964, 8123/1965, and U.S. Pat. Nos. 3,198,177, 3,156,650, and 3,262,812.

6. A method comprising reducing a solution containing a metal salt having ferromagnetic properties by adding a reducing agent thereto. This method is described in, for example, Japanese patent publication Nos. 20520/1963, 26555/1963, 20116/1968, 9869/1970, 14934/1970, 7820/1972, 16052/1972, 41718/1972, Japanese patent application (OPI) Nos. 1363/1972, 42252/1972, 42253/1972, 44194/1973, 79754/1973, 82396/1973, and U.S. Pat. Nos. 3,607,218, 3,756,866, 3,206,338, 3,494,760, 3,535,104, 3,567,525, 3,661,566, 3,663,318, 3,669,643, 3,672,867, and 3,726,664.

The present invention is concerned with the solution reduction process as shown in the above method (6). In particular, the present invention is concerned with a post-treatment of ferromagnetic metal powders produced by the method in which metal salts containing ferromagnetic metals are reduced in solutions thereof, i.e., the above described method (6).

In general, the ferromagnetic metal powder produced by method (6), after separation of the reaction mother liquor, and removal of anions such as unreacted metal ions, sulfate ion ($SO_4^{2-}$), chloride ion ($Cl^-$), and the like by sufficient water-washing, is treated by replacing the solvent or by drying in an inert gas, i.e., an non-oxidizing atmosphere. The thus prepared ferromagnetic metal powder, however, has poor magnetic stability and, in particular, is easily affected by humidity, i.e., it is gradually oxidized due to the water vapor in the air. Thus, the magnetic properties of these powders containing iron as the major component often are lost. Moreover, if this oxidation phenomenon takes place during a post-treatment after the reduction, the high maximum magnetic flux density (Bm), one of the excellent characteristics of the ferromagnetic metal powder, tends to be lost.

Various methods have been proposed in the past to remove these problems. For example, a method comprising adding reducing non-magnetic elements to the reaction bath to provide resistance to oxidation is described in Japanese patent publication Nos. 20520/1963, 7820/1972, Japanese patent application (OPI) Nos. 78896/1975 (corresponding to U.S. patent application Ser. No. 524,858, filed Nov. 18, 1974 now Pat. No. 4,007,072) and 78897/1975 (corresponding to U.S. patent application Ser. No. 524,860, filed Nov. 18, 1974), U.S. Pat. Nos. 3,535,104, 3,669,643, and 3,672,867, etc. Another method comprising adding an organic compound an additive to the reaction solution is described in Japanese patent publication Nos. 20116/1968, 14934/1970, 7820/1972, 7820/1972, 42253/1973, 44194/1972, 79754/1973, 82396/1973, and U.S. Pat. No. 3,607,218, etc.

In particular, a method comprising carrying out the reaction in the presence of higher aliphatic acids as described in Japanese patent publication No. 20116/1968, a method comprising carrying out the reaction in the presence of compounds containing sulfone groups or an aromatic ring as described in Japanese patent publication No. 14934/1970, and a method comprising carrying out the reaction in the presence of surface active agents as described in Japanese patent publication No. 7820/1972, are well known.

According to these methods, the reaction is carried out after adding surface active agents and so on to the reaction bath. However, it has been found that the addition of the surface active agents and the like in amounts sufficient to increase the maximum magnetic flux density (Bm) and resistance to oxidation only produces ferromagnetic metals which have poor coercive forces (Hc) and squareness ratios (Br/Bm). In other words, where the surface active agents and the like are added to the reaction bath to carry out the reaction, it is impossible to obtain ferromagnetic metal powders having high maximum magnetic flux density (Bm) and high resistance to oxidation without deteriorating their magnetic properties, i.e., the coercive force and the squareness ratio.

As a result of various investigations on methods of preventing oxidation from occurring during the post-treatment after the reduction in producing ferromagnetic metal powders using a solution reduction process, it has been found that oxidation during water-washing is the most significant. Thus, methods of washing with an aqueous solution containing saccharin, an aqueous solution containing a reducing material, and the like, have been proposed in Japanese patent application (OPI) Nos. 18345/1975, 19667/1975, 41097/1975 (corresponding to U.S. patent application Ser. No. 497,794 now U.S. Pat. No. 3,966,510, filed on Aug. 15, 1974), 41756/1975 (corresponding to U.S. patent application Ser. No. 498,338, filed on Aug. 19, 1974), 104164/1975, 104397/1975 corresponding to U.S. patent application Ser. No. 598,098 filed on July 21, 1975 now U.S. Pat. No. 4,020,236 ), and 106198/1975, and Japanese patent application No. 9698/197 (corresponding to U.S. patent application No. 600,245 filed on July 24, 1975).

The present invention provides a more improved method of producing ferromagnetic metal powders.

SUMMARY OF THE INVENTION

An object of the present invention is to provide a method of preventing the oxidation of ferromagnetic metal powders during the production thereof.

Another object of the present invention is to provide ferromagnetic metal powders having excellent resistance to humidity.

A further object of the present invention is to provide ferromagnetic metal powders having excellent dispersibility in a binder.

Still another object of the present invention is to provide a process for the production of ferromagnetic metal powders, which enables a post-treatment after the reduction to be carried out in a short period of time, and which is convenient for mass production.

A still further object of the present invention is to provide ferromagnetic metal powders in which the magnetic properties do not vary with the passage of time.

Another object of the present invention is to provide ferromagnetic metal powders having excellent properties as magnetic recording media for high density recording.

Another object of the present invention is to provide ferromagnetic metal powders capable of being used in a permanent magnet, a magnetic core, a magnetic fluid, and the like.

Another object of the present invention is to provide ferromagnetic powders having a high maximum magnetic flux density (Bm), with high resistance to oxidation, and a high squareness ratio (Br/Bm) at a high coercive force (Hc).

These objects are attained by treating a ferromagnetic metal powder produced by the solution reduction process, such as the above described method (6), with an aqueous solution containing at least one anionic surface active agent.

DETAILED DESCRIPTION OF THE INVENTION

As described above, the present invention provides a process for producing ferromagnetic metal powders comprising treating ferromagnetic metal powders produced by a solution reduction process with an aqueous solution containing at least one anionic surface active agent.

Anionic surface active agents which can be used in the present invention include those compounds containing, as the hydrophilic group, a carboxylate salt group, a sulfate salt group, a phosphate salt group, a dithiophosphate salt group, or a sulfonate salt group, or the like. In these cases, suitable salts of such hydrophilic groups include the ammonium, alkali metal (e.g., Li, Na, K, and the like), and alkali earth metal (e.g., Mg, Ca, Ba, and the like) salts thereof. Aliphatic carboxylic acids can also be used, although they are not surface active agents, such as unsaturated fatty acids having from 6 to 22 carbon atoms, e.g., lauroleic acid, 4-tetra decenoic acid, zoomaric acid, oleic acid, elaidic acid, linoleic acid, elacostearic acid, linolenic acid, arachidoric acid, erucic acid, brassylic acid, and the like.

More particularly, the following anionic surface active agents can be used.

1. Surface active agents containing a carboxylate salt group.

Aliphatic acid salts containing about 6 to 32 carbon atoms.

2. Surface active agents containing a sulfate salt group.

Salts of sulfates of higher alcohols containing about 6 to 18 carbon atoms, salts of sulfates of aliphatic acids containing about 6 to 32 carbon atoms, salts of sulfates of aliphatic acid esters having alkyl groups containing about 1 to 4 carbon atoms as a substituent, salts of sulfates of polyoxyethylene alkyl ethers, $R(C_2H_4O)_noSo_3^-$ (wherein R is an alkyl or alkenyl group containing about 8 to 18 carbon atoms, and $n$ is an integer of 1 to 6), salts of sulfates of polyoxyethylene phenyl ethers,

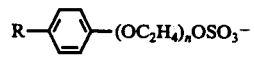

(wherein R is an alkyl or alkenyl group containing about 8 to 18 carbon atoms, and $n$ is an integer of 1 to 6) salts of sulfates of fats and oils, or waxes, salts of sulfonated olefins containing about 12 to 18 carbon atoms, etc.

3. Surface active agents containing a sulfonic acid salt group.

Salts of alkylaryl sulfonic acids, salts containing an amide bond alkylaryl sulfonic acid, salts containing an ether bond alkylaryl sulfonic acid, salts of ester-combined alkylaryl sulfonic acids, salts of α-olefin sulfonic acids, salts of ethercombined sulfonic acids, salts containing an amide bond sulfonic acids, salts containing an ester bond sulfonate, etc.

4. Surface active agents containing a phosphate salt group.

Salts of mono-phosphates of higher alcohols containing about 6 to 18 carbon atoms, salts of phosphoric acid diesters, salts of phosphates of adducts of higher alcohols containing about 6 to 18 carbon atoms and ethylene oxide, etc.

5. Surface active agents containing a dithiophosphate salt group.

Salts of dialkyldithiophosphates (including the zinc salts thereof).

In more detail, the following surface active agents can be used.

Aliphatic carboxylic acid salts containing about 6 to 32 carbon atoms such as sodium caproate, potassium enanthate, sodium caprate, magnesium caprate, sodium pelargonate, ammonium pelargonate, sodium caprate, magnesium caprate, sodium undecylate, magnesium undecylate, potassium undecylenate, barium undecylenate, sodium laurate, ammonium laurate, magnesium laurate, potassium laurolenate, magnesium laurolenate, sodium dodecanate, potassium dodecanate, sodium myristate, potassium myristate, ammonium myristate, magnesium myristate, sodium 4-tetradecanecarboxylate, ammonium 4-tetradecanecarboxylate, magnesium 4-tetradecane carboxylate, sodium pentadecanate, sodium palmitate, ammonium palmitate, magnesium palmitate, sodium zoömarate, ammonium zoömarate, magnesium zoömarate, sodium margarate, ammonium margarate, calcium margarate, sodium stearate, potassium stearate, ammonium stearate, magnesium stearate, calcium stearate, sodium petroselinate, magnesium petroselinate, lithium oleate, sodium oleate, potassium oleate, ammonium oleate, magnesium oleate, calcium oleate, barium oleate, sodium elaidate, potassium elaidate, ammonium elaidate, magnesium elaidate, calcium elaidate, sodium ricinoleate, potassium ricinoleate, magnesium ricinoleate, sodium linoleate, potassium elacostearate, sodium linolenate, potassium linolenate, sodium parinarate, potassium parinarate, sodium nonadecanate, ammonium nonadecanate, magnesium nonadecanate, sodium arachidate, ammonium arachidate, magnesium arachidate, sodium arachidonate, potassium arachidonate, sodium godoleate, ammonium godoleate, magnesium godoleate, sodium heneicosanate, sodium behenate, potassium behenate, ammonium behenate, calcium behenate, magnesium behenate, sodium erucate, potassium erucate, magnesium erucate, calcium erucate, ammonium erucate, sodium brassylate, ammonium brassylate, magnesium brassylate, sodium lignocerate, potassium lignocerate, ammonium lignocerate, calcium lignocerate, magnesium lignocerate, sodium cerotate, potassium cerotate, ammonium cerotate, magnesium cerotate, magnesium cerotate, sodium montanate, potassium monotanate, ammonium montanate, magnesium montanate, calcium montanate, sodium melissinate, potassium melissinate, ammonium melissinate, magnesium melissinate, and the like.

Salts of alkylaryl sulfonic acids such as sodium xylenesulfonate, sodium dodecylbenzenesulfonate, ammonium polybutyl naphthalenesulfonate, potassium isopropyl naphthalenesulfonate, sodium nonylbenzenesulfonate, and the like;

Sulfonates of alkylsuccinic acid esters such as sodium N-octadecylsulfosuccinate, tetrasodium N-(1,2-dicarboxyethyl)-N-octadecylsulfosuccinate, diamyl sodium sulfosuccinate, dihexyl potassium sulfosuccinate, dioctyl sodium sulfosuccinate, and the like;

Amide-combined sulfonates such as sodium N-cyclohexyl-N-palmitoyl taurate, sodium oleylmethyl taurate, sodium N-methyl-N-oleyltaurate, and the like;

Sulfonates of higher aliphatic acids containing about 6 to 18 carbon atoms such as sodium oleylalcoholsulfonate, potassium oleylcetylalcoholsulfonate, sodium laurylalcoholsulfonate, and the like;

Salts of sulfates of higher alcohols such as oleylcetyl ammonium sulfate, octadecylalcohol sodium sulfate, and the like;

Salts of sulfates of fatty oils fats and waxes such as sulfonated castor oil, sulfonated coconut monoglyceride, sulfontated glycerol monolithinate, sulfonated pine oil, sulfonated cotton seed oil, sulfonated palm oil, sulfonated Japan tallow, sulfonated lard, sulfonated whale oil, sulfonated palm wax, sulfonated carnauba wax, sulfonated shellac wax, and the like;

Salts of ester-combined sulfates such as a sulfonated sodium salt of butyl ricinoleate, and the like;

Salts of olefin-combined sulfates such as ammonium salt of alkylphenoxypolyethylene ehtanol, and the like;

Salts of phosphates such as sodium monooleyl phosphate, sodium dodecylphosphate, and the like; and Pentasodium diethylenetriamine pentaacetate, sodium oleylstearyl isothionate, etc.

Commercially available detergents often contain anionic surface active agents as the major component, and furthermore, they contain additives such as builders and the like. Those detergents with additives such as builders and the like incorporated therein can be used in the present invention, provided that they contain at least one anionic surface active agent.

Preferred anionic surface active are aliphatic acid salts containing about 11 to 18 carbon atoms. Unsaturated aliphatic acid salts such as an oleate, a linolate, or a linolenate are more effective and suitable than saturated aliphatic acid salts such as a laurate, a myristrate, a palmitate, or a stearate. Of these aliphatic acid salts, alkali metal salts, particularly the sodium salt and the potassium salt, have been found to be preferred.

At least one member selected from the above described anionic surface active agents is used as an aqueous solution thereof.

The term "anionic surface active agent-containing aqueous solution" as used herein designates those solutions in which the anionic surface active agent is dissolved in water, or a mixture of water and a polar organic solvent completely or partially, miscible with water (in this case, about 50% by weight or more of the mixture is water). Examples of suitable polar organic solvents include alcohols such as methyl alcohol, ethyl alcohol, propyl alcohol, isopropyl alcohol, butyl alcohol, etc., ketones such as acetone, methyl ethyl ketone, methyl isobutyl ketone, etc.; amines such as methylamine, ethylamine, iso-propylamine, n-propylamine, etc.; dimethylformamide, dimethylsulfoxide, tetrahydrofuran, dioxane, and the like.

It is preferred from a practical standpoint that the concentration of the anionic surface active agent in the aqueous solution is about 50 ppm or higher, preferably in a range of about 0.001 to 0.3 mole/l. At a concentration of below about 50 ppm, operational efficiency is very poor, and it is difficult to obtain a ferromagnetic metal powder which has improved resistance to oxidation.

The weight ratio (A/P) of the amount of the anionic surface active agent (A) to the amount of the ferromagnetic metal powder (P) preferably ranges from about 0.0001:1 to 0.20:1. It is considered that a sufficient effect can be obtained when a mono- or di-molecular layer of the anionic surface active agent is absorbed on the surface of the ferromagnetic metal powder.

In treating the ferromagnetic metal powder with the anionic surface active agent-containing aqueous solution, if the conductivity of the water containing the ferromagnetic metal powder is about 50 m$\mu$/cm or less when the ferromagnetic metal powder is removed, the ferromagnetic metal powder is preferably washed. Particularly preferably the ferromagnetic metal powder is washed when the conductivity is 20 m$\mu$/cm or less. This is so because if the conductivity is not less than 50 m$\mu$/cm, the anionic surface active agent and dissolved ions tend to interact, forming insoluble salts, whereby it is difficult to separate the insoluble salts from the ferromagnetic metal powder.

The pH of the anionic surface active agent-containing aqueous solution preferably ranges from about 3 to 9. Where the pH is less than about 3, a dissolution of the ferromagnetic metal powder tends to take place. On the other hand, where the pH is above about 9, precipitation of hydroxides and the like tend to occur, and in order to remove the precipitate so produced, complex salts and the like must be formed, whereby the composition of the solution is complicated.

The treatment condition for the ferromagnetic powder with the above anionic surface active agent-containing aqueous solution are: time from about 30 seconds to about 50 hours, preferably from 2 minutes to 2 hours; temperature from about 10 to about 80° C, preferably from 16° to 30° C. The treating time includes the time of mixing and dispersing the ferromagnetic powder and anionic surface active agent in an aqueous solution and includes the case of storage for 2 days under the same conditions after mixing and dispersing. While the above treating can be carried out at wide range of temperatures, e.g., low to high, it is most preferably carried out at room temperature.

The ferromagnetic metal powders as used in the present invention are, as described above, produced by a solution reduction process, for example, 6. a method comprising reducing a metal salt capable of forming a ferromagnetic metal powder in a solution thereof with a reducing agent.

The present invention can be particularly effectively applied to those ferromagnetic metal powders produced by method (6) in which a metal salt capable of forming a ferromagnetic metal powder is reduced in a solution thereof.

More specifically, those ferromagnetic metal powders produced by reducing a metal salt capable of forming a ferromagnetic metal powder with, as a reducing agent, an acid containing a phosphinate (hypophosphite ion) ion or a salt thereof; a boron hydride compound such as sodium borohydride, diethylamine borane, methyl diborane, and the like or the derivatives thereof; hydrazine and its derivatives; and metal powders such as Mg, Ca, Al, etc., etc. can be used. If a phosphinic acid ion-containing acid or a salt thereof is used as the reducing agent, phosphorus, P, is incorporated into the ferromagnetic metal powder formed in a proportion of about 0.1 to 10% by weight during the course of the reaction. In the case of the boron hydride compounds or the derivatives thereof, boron, B, is incorporated into the ferromagnetic metal powder in a proportion of about 0.1 to 10% by weight during the course of the reaction.

At least about 75% by weight, preferably 80% by weight, of this ferromagnetic metal powder is a metal. At least about 80% by weight of the metal comprises a metal which is at least one member selected from Fe, Co, and Ni, i.e., Fe, Co, Ni, Fe—Co, Fe—Ni, Co—Ni, and Fe—Co—Ni as the major component. In addition to these metals, about 20% by weight or less, preferably 0.5 to 5% by weight, of one or more of Al, Si, S, Sc, Ti, V, Cr, Mn, Zn, Y, Mo, Rh, Pd, Ag, Sn, Sb, Te, Ba, Ta, W, Re, Au, Hg, Pb, Bi, La, Ce, Pr, Nd, B, P and the like are present, if necessary in order to improve the properties of the ferromagnetic metal powder. For example, where a boron hydride compound is used as the reducing agent, in a preferred example the metal comprises 80% by weight or more of the ferromagnetic metal powder, and the metal comprises about 68 to 89% by weight of iron, about 7 to 34% by weight of cobalt, and about 0.5 to 5% by weight of chromium. The remainder comprises water, hydroxides, oxides, and the like.

In accordance with the method of the present invention, a ferromagnetic metal powder, e.g., a ferromagnetic metal powder obtained by effecting oxidation-reduction reaction using sodium borohydride as the reducing agent, is separated from the reaction solution, and the ferromagnetic metal powder so separated is, if the conductivity of the reaction solution is not more than 20 m$\mu$/cm, immediately, or if the conductivity is not less than 20 m$\mu$/cm, after reducing the conductivity to not more than 20 m$\mu$/cm by washing the ferromagnetic metal powder with water, treated with an aqueous solution containing the anionic surface active agent, for example, sodium oleate, to adsorb the surface active agent on the surface of the ferromagnetic metal powder. In effecting the treatment, it is important to disperse the ferromagnetic metal powder uniformly in the aqueous solution. Then, any excess of the sodium oleate is removed directly or by washing with water. In carrying out the replacement, it has been found that the replacement can be carried out in a short period of time if an an organic solvent is used. In this case, it is effective to incorporate a reducing agent into the organic solvent.

The thus treated ferromagnetic metal powder is, as it is, dried in a non-oxidizing atmosphere such as nitrogen, an inert gas, or the like, or in vacuo, or in the atmosphere. Alternatively, the metal powder can be immersed in an organic solvent. Usually, the ferromagnetic metal is mixed with and dispersed in a binder, and the mixture is coated on a support and dried, which is used as a magnetic recording member in the form of a tape, a disc, a sheet, a card, or the like.

In accordance with an even more effective method, non-magnetic elements or organic compounds can be added to the metal salt having ferromagnetic properties and the mixture so prepared reduced to produce a ferromagnetic powder having excellent resistance to oxidation and the like, whereafter the ferromagnetic powder is treated with a solvent containing an anionic surface active agent or agents.

Examples of non-magnetic elements as are mentioned above include Cr, Ti, Pb, Mn, Pt, As, Ca, Ge, Ta, Zn and the like, these disclosed in U.S. Pat. Nos. 3,535,104; 3,661,556, and 3,672,867; Japanese patent publication No. 20520/1963; and Japanese patent applications (OPI) 78896/1975 (corresponding to U.S. patent application Ser. No. 524,858, filed Nov. 18, 1974, now Pat. No. 4,007,072) and 78897/1975 (corresponding to U.S. patent application Ser. No. 524,860, filed Nov. 18, 1974).

When the amount of the ferromagnetic metal ions solved in the solution is 0.002 to 2.0 mol/liter, preferably from 0.01 to 0.5 mol/liter, the non-magnetic elements can be present in an amount of 0.0 to 15.0 mol%, preferably 0.0 to 5.0 mol%, based on the ferromagnetic metal ions.

Examples of the organic compounds as are mentioned above (present in the reaction solution) are fatty acids, aryl sulfonates, surface active agents, organic solvents, complexing agents, viscosity increasing agents, passivating agents, proteins, carbohydrates, and the like, such as those disclosed in U.S. Pat. Nos. 3,607,218 and 3,661,556; Japanese patent publication Nos. 20116/1968, 14934/1970 and 7820/1972; and Japanese patent application Nos. (OPI) 42253/1972 (corresponding to U.S. Pat. No. 3,725,036), 79754/1973 (corresponding to U.S. patent application Ser. No. 326,358, filed Jan. 24, 1973 now abandoned), 82396/1973 and 41756/1975 (corresponding to U.S. patent application Ser. No. 498,338, filed Aug. 19, 1974).

Fatty acids, aryl sulfonates and surface active agents can be added in an amount of about 0.05 to 1.0 wt%, preferably 0.06 to 0.7 wt%, while organic solvent(s), complexing agent(s), and passivating agent(s) can be added in an amount of about 0.1 to 50 wt%, proteins and carbohydrates can be added in an amount of about 0.5 to 10 wt%, preferably 1.0 to 6.0 wt%, and viscosity increasing agents can be added to increase the system viscosity to 2.0 cp or more, preferably 2.0 to 10.0 cp.

In accordance with the method of the present invention, a ferromagnetic metal powder is obtained which has a coercive force of about 10 to 2000 Oe or more, an $\sigma_s$ value of about 80 emu/g or more (at Hm = 2000 Oe), and a Br/Bm ratio of about 0.50 or more. It is possible to produce a ferromagnetic metal powder having a particle size of about 50 to 1000 Å in the direction of the minor axis, and furthermore, it is possible to produce a ferromagnetic metal powder whose particle size is spherical to needle-like (including a needle-like shape in which 2 to 20 spherical particles are connected).

Examples of preferred compositions for the ferromagnetic alloy powder of the above components are as follows:

Fe—Co—Cr—B, Fe—Co—Ti—B, Fe—Co—Pb—B, Fe—Co—Sn—B, Fe—Co—Sb—B, Fe—Co—S—B, Fe—Ni—Cr—B, Fe—Ni—Ti—B, Fe—Ni—Pb—B, Fe—Ni—Sn—B, Fe—Ni—Sb—B, Fe—Ni—S—B, Co—Ni—Cr—P, Co—Ni—Ti—P, Co—Ni—Pb—P, Co—Ni—Sn—P, Co—Ni—Sb—P, Co—Ni—S—P, Co—Ni—Pb—P, Fe—Co—Ni—Cr—B, Fe—Co—Ni—Ti—B, Fe—Co—Ni—Pb—B, Fe—Co—Ni—Sn—B, Fe—Co—Ni—Sb—B, Fe—Co—Ni—S—B, Fe—Co—Ni—Cr—P, Fe—Co—Ni—Ti—P, Fe—Co—Ni—Pb—P, Fe—Co—Ni—Sn—P, Fe—Co—Ni—Sb—P, Fe—Co—Ni—S—P, which comprise at least one component from the following groups, respectively:

(Fe, Co, Ni) + (Cr, Ti, Pb, Sn, Sb, S) + (B, P).

The anionic surface active agent is adsorbed on the surface of the ferromagnetic metal powder, and thus the surface of the metal powder is rendered hydrophobic. The powder comprises quite fine particles. Therefore, the amount of the anionic surface active agent adsorbed on the surface is large even though the surface active agent is adsorbed in the form of a monomolecular layer. In the case of a dry powder or a water-containing slurry, the surface active agent can be analysed by gas chromatography, heat-decomposition gas chromatography, or known chemical analyses. The analysis of the surface active agent can be facilitated by dissolving the metal powder in a weak acid or the like and removing the metal powder. The surface active agent, even in the form of a slurry in an organic phase, can be analyzed by infrared analysis, or the like.

The effect of the present invention can be increased by heating the ferromagnetic metal powder produced by the above described methods in a non-oxidizing atmosphere for from about 30 minutes to about 50 hours, or in the presence of a small amount of $H_2O$ or $O_2$, where the amount of water and/or oxygen is about 10% by weight or less of the ferromagnetic metal powder. Such an improved method is described in, for example, Japanese patent publication Nos. 3862/1960, 26555/1963, 9869/1970, and 16052/1972. The present invention can be used in combination with these improved methods.

Hitherto known thermoplastic resins, thermosetting resins, or mixtures thereof can be used as binders for the ferromagnetic metal powder of the present invention.

Suitable thermoplastic resins are those resins which have a softening point of about 150° C or less, an average molecular weight of about 10,000 to 200,000, and a degree of polymerization on the order of about 200 to 2,000 e.g., a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, a polyvinyl fluoride, a vinylidene chloride-acrylonitrile copolymer, a butadiene-acrylonitrile copolymer, a polyamide resin, polyvinyl butyral, cellulose derivatives such as cellulose acetate butyrate, cellulose diacetate, cellulose triacetate, cellulose propionate, cellulose nitrate, and the like, a styrene-butadiene copolymer, a polyester resin, a chlorovinyl ether-acrylate copolymer, an amino resin, various synthetic rubber based thermoplastic resins, and mixtures thereof.

Suitable examples of these resins which can be used are described in Japanese patent publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972, 27886/1973, U.S. Pat. Nos. 3,144,352, 2,419,420, 3,499,789, 3,713,887, etc.

Suitable thermosetting resins have a molecular weight of about 200,000 or less as a coating solution, and when heated after coating and drying, the molecular weight becomes infinite due to reactions such as condensation, addition, and the like. Of these resins, preferred resins are those resins which do not soften or melt before the resin thermally decomposes. Representative examples of these resins are a phenol resin, an epoxy resin, a polyurethane hardening type resin, a urea resin, a melamine resin, an alkyd resin, a silicone resin, an acryl based reactive resin, an epoxy-polyamide resin, a mixture of a high molecular weight polyester resin and an isocyanate prepolymer, a mixture of a methacrylic acid salt copolymer and a diisocyanate prepolymer, a mixture of a polyesterpolyol and a polyisocyanate, a urea-formaldehyde resin, a mixture of a low molecular weight glycol, a high molecular weight diol and triphenylmethane triisocyanate, a polyamine resin, and mixtures thereof, etc.

Suitable examples of these resins which can be used are described in Japanese patent publication Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, U.S. Pat. Nos. 3,144,353, 3,320,090, 2,437,510, 3,597,273, 3,781,210, 3,781,211, etc.

These binders can be used individually or in combination with each other, and other additives can be added to the binders. The weight ratio of the ferromagnetic powder to the binder is generally about 100:10 to 100:200. When the proportion of the binder is less than about 10 parts by weight, the ability of the binder to bind the fine ferromatic powder becomes weak, and the ferromagnetic powder tends to come off from the magnetic layer. This leads to the disadvantage that the fine ferromagnetic powder that has come off adheres to the magnetic head, or damages the surface of the magnetic layer. On the other hand, when the proportion of the binder is above about 200 parts by weight, the magnetic flux density of the magnetic layer is reduced because the non-magnetic property of the binder dominates the layer characteristics.

In addition to the above described binder and ferromagnetic fine powder, additives such as a dispersing agent, a lubricant, an abrasive, an antistatic agent, and the like can be used in the magnetic recording layer.

Suitable dispersing agents are fatty acids containing about 12 to 18 carbon atoms (e.g., having the formula $R_1COOH$ wherein $R_1$ is an alkyl group containing about 11 to 17 carbon atoms), e.g., caprylic acid, capric acid, lauric acid, myristic acid, palmitic acid, stearic acid, oleic acid, elaidic acid, linolic acid, linolenic acid, stearolic acid, and the like; metallic soaps comprising the alkali metal (Li, Na, K, etc.) salts or the alkaline earth metal (Mg, Ca, Ba, etc.) salts of the above described fatty acids; and lecithin, etc. In addition, higher alcohols containing about 12 or more carbon atoms and the sulfates thereof can be used. These dispersing agents are generally employed in a proportion of about 0.5 to 20 parts by weight per 100 parts by weight of the binder. Suitable dispersing agents are described in Japanese patent publication Nos. 28369/64, 17945/69 and 15001/73 and U.S. Patent Nos. 3,387,993 and 3,470,021.

Suitable lubricants which can be used include silicone oils, graphite, molybdenum disulfide, tungsten disulfide, fatty acid esters produced from a monocaboxylic acid containing about 12 to 16 carbon atoms and a monovalent alcohol containing about 3 to 12 carbon atoms, fatty acid esters produced from a monocarboxylic fatty acid containing about 17 or more carbon atoms and a monovalent alcohol, in which the total number of carbon atoms ranges from about 15 to 28, and the like. These lubricants are generally used in a proportion of about 0.2 to 20 parts by weight per 100 parts by weight of the binder. These lubricants are described in Japanese patent publication Nos. 23889/1968, 24041/1973, 18482/1973, U.S. Pat. Nos. 3,470,021, 3,492,235, 3,497,411, 3,523,086, 3,625,760, 3,630,772, 3,634,253, 3,642,539, 3,687,725, *IBM Technical Disclosure Bulletin,* Vol. 9, No. 7, page 779 (December, 1966), *ELEKTRONIK,* No. 12, page 380 (1961), etc.

Typical abrasive agents which can be used include materials generally used, e.g., fused alumina, silicon carbide, chromium oxide, corundum, synthetic corundum, diamond, synthetic diamond, garnet, emery (main component: corundum and magnetite), and the like. Those abrasive agents are used which have an average particle size of about 0.05 to 5 $\mu$m, preferably about 0.1 to 2 $\mu$m. These lubricants are generally used in a proportion of from about 0.5 to 20 parts by weight per 100 parts by weight of the binder. These abrasive agents are described in Japanese patent application OPI No. 115510/1974, U.S. Pat. Nos. 3,007,807, 3,041,196, 3,293,066, 3,630,910, 3,687,725, British Patent No. 1,145,349, West German Pat. (DT-PS) No. 853,211, etc.

Antistatic agents which can be used in the present invention include inorganic materials such as carbon black and organic materials, for example, natural surface active agents such as saponin; nonionic surface active agents such as alkylene oxide based, glycerin based, glycidol based surface active agents, and the like; cationic surface active agents such as heterocyclic compounds, e.g., higher alkylamines, quaternary ammonium salts, pyridine, and the like, phosphoniums, sulfoniums, and the like; anionic surface active agents containing acid groups such as carboxylic acid groups, sulfonic acid groups, phosphoric acid groups, sulfate groups, phosphate groups, and the like; amphoteric surface active agents such as sulfates or phosphates of amino acids, amino sulfonic acids, and amino alcohols, and the like; etc. A suitable amount of the inorganic material is about 5% by weight and of the organic material is about 0.5 to 1% by weight, each based on the weight of the ferromagnetic material.

Examples of the surface active agents that can be used as antistatic agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, 3,545,974, West German patent application (OLS) No. 1,942,665, British Pat. Nos. 1,077,317, 1,198,450, Ryohei Oda, et al. *Kaimen Kassei Zai no Gosei to so no Oyo (Synthesis of Surface Active Agents and Their Applications),* Maki Shorten, Tokyo (1964), A.M. Schwartz et al. *Surface Active Agents* Interscience Publications Corp. (1958), J.P. Sisley et al. *Encyclopeida of Surface Active Agents,* Vol. 2, Chemical Publishing Co. (1964), *Kaimen Kassei Zai Binran (Handbook of Surface Active Agents),* 6th, Ed., Sangyo Tosho Co., Dec. 20, 1966, etc.

These surface active agents can be used individually or in combination with each other. These surface active agents are generally used as antistatic agents, but in some cases they are used for other purposes, for example, for improving dispersibility, magnetic properties, and lubricity, or as auxiliary coating agents.

The magnetic recording layer is formed by dissolving or dispersing the above described composition in an organic solvent and then coating the resulting solution on a support.

The non-magnetic support can have a thickness of about 3 to 50 $\mu$m, preferably 10 to 40 $\mu$m. If the thickness is less than about 3 $\mu$m, the tensile strength of the support required as a magnetic recording material decreases, and the support tends to break or deform. If the thickness exceeds about 50 $\mu$m, the volume and weight of the magnetic recording material increase, and therefore the recording density per unit volume or weight decreases. Suitable materials which can be used for producing the support are polyesters such as polyethylene terephthalate, polyethylene-2,6-naphthalate, and the like, polyolefins such as polypropylene, and the like, cellulose derivatives such as cellulose triacetate, cellulose diacetate, and the like, polycarbonate, etc.

The magnetic recording layer can be coated on the support using coating methods such as air doctor coating, blade coating, air knife coating, squeeze coating, dip coating, reverse roll coating, transfer roll coating, gravure coating, kiss coating, cast coating, spray coating, and the like, and other methods can be also used. These methods are described in *Coating Kogaku* (Coating Engineering), pages 253 to 277, published by Asakura Shoten (Mar. 20, 1971).

Typical organic solvents which can be used in the present invention include ketones, e.g., acetone, methyl ethyl ketone, methyl isobutyl ketone, cyclohexanone, and the like; alcohols, e.g., methanol, ethanol, propanol, butanol, and the like; esters, e.g., methyl acetate, ethyl acetate, butyl acetate, ethyl lactate, glycol monoethyl ether acetate, and the like; ethers and glycol ethers, e.g., diethyl ether, glycol monoethyl ether, glycol dimethyl ether, dioxane, and the like; aromatic hydrocarbons, e.g., benzene, toluene, xylene, and the like; chlorinated hydrocarbons, e.g., methylene chloride, ethylene chloride, carbon tetrachloride, chloroform, ethylene chlorohydrin, dichlorobenzene, and the like, etc., and these solvents can be used individually or in combination with each other.

The magnetic layer coated on the support by the above method is dried after, if desired, the coating has been subjected to a treatment for orienting the magnetic powder in the layer. Suitable treatments for orienting the magnetic powder in the layer are disclosed in U.S. Pat. Nos. 1,949,840, 2,796,359, 3,001,891, 3,172,776, 3,416,949, 3,473,960, and 3,681,138; Japanese patent publication Nos. 3427/1957, 28368/1964, 23624/1965, 23625/1965, 13181/1966, 13043/1973 and 39722/1973. If required, the magnetic layer can be subjected to a surface-smoothening treatment, or cut to the desired shape, to thereby form the magnetic recording material of this invention. Suitable surface-smoothening techniques are disclosed in U.S. Pat. Nos. 2,688,567, 2,998,325, and 3,783,023, and German patent application (OPI) No. 2,405,222.

In the above orienting treatment for the magnetic layer the orienting magnetic field can be either an AC or DC magnetic field with a field strength of about 500 to 2,000 gauss. The drying temperature can range from about 50° to about 100° C, and the drying time is about 3 to 10 minutes.

In the surface-smoothening treatment of the magnetic layer, preferably a calendering method is used in which the magnetic layer is passed between a metal roll and a non-metallic roll while the layer is heated under pressure. A combination of a metal roll and a roll made of cotton and a combination of a metal roll and a roll made of a synthetic resin are especially preferred. The pressure used in this treatment is about 25 to 500 Kg/cm, and the surface temperature of the metal roll is kept at about 35° to 150° C. The rate of the treatment is about 5 to 120 meters/min. When the pressure and temperature are below the lower limits of the above-specified ranges, the effect of the surface-smoothening treatment is difficult to achieve. Pressures and temperatures higher than the upper limits of the above specified ranges are not preferred because the support of the magnetic recording material is deformed. When the treating rate is less than about 5 meters/min. the operating efficiency is low, and if the rate is above about 120 meters/min., operation is difficult.

The most preferred process for the production of a magnetic recording medium disclosed above is the process disclosed in Japanese patent application (OPI) 41506/1975 (corresponding to U.S. patent appliction Ser. No. 498,337 now Pat. No. 3943012, filed on Aug. 19, 1974).

In accordance with the method as described above, a magnetic recording medium can be obtained which has a Br/Bm of about 0.75 or more and a Bm of about 2500 gauss.

Some of the effects and advantages achieved in the present invention are shown below.

1. The oxidation of ferromagnetic metal powders with the passage of time can be prevented, and thus ferromagnetic metal powders can be obtained which have a high Bm value.
2. Metal powders can be obtained which have excellent dispersibility in a binder.
3. Ferromagnetic metal powders can be obtained which are resistant to humidity.
4. Metal powders having stable magnetic properties can be obtained.
5. The coercive force (Hc) of the metal powder can be increased.
6. The operations in producing the metal powder are simplified.

The present invention will be explained in greater detail by reference to the following examples and comparison examples. All parts percentages ratios and the like are by weight unless otherwise indicated. It can be easily understood by one skilled in the art that changes and modifications in the components, ratios, procedure order, and the like can be made without departing from the spirit of the present invention. Thus, the present invention is not to be construed as being limited by the following examples.

EXAMPLE 1

| Liquid A | |
|---|---|
| Cobalt Sulfate | 0.2 M/l |
| Glycolic Acid (70% aq. soln.) | 40 ml/l |
| Palladium Chloride (used after dissolution in HCl) | 10 mg/l |
| Liquid B | |
| Sodium Phosphinate | 0.4 M/l |
| Liquid C | |
| Sodium Hydroxide (2 N aq. soln.) | 100 ml |

One part of Liquid A and 1 part of Liquid B were mixed, and the mixture was then heated to 70° C with gentle stirring. Separately, Liquid C was heated to 30° C, and this liquid was then added to the mixture of Liquids A and B, in a DC magnetic field of 500 Oe, to cause an oxidation-reduction reaction to occur. Three minutes after the reactants were mixed, the reaction took place vigorously. After that, the reaction gradually became gentle, and the reaction was completed in 15 minutes. The mixed solution turned transparent, and a black ferromagnetic metal powder resulted.

The thus obtained ferromagnetic metal powder was separated from the mother liquor with a Nutsch funnel and washed with 5 parts of distilled water per part of the metal powder. After this washing, the metal powder was washed with 10 parts of an aqueous solution containing 0.1 part of sodium oleate.

The metal powder so washed was then washed with 5 parts of acetone. After removing the acetone, the metal powder was dried by air maintained at 40° C, whereby a ferromagnetic powder was obtained. This sample is designated P-1.

To 300 parts of this powder was added 1,200 parts of butyl acetate, and the mixture was stirred for 2 hours at 40° C.

Thereafter, the following components were mixed with the metal powder.

| | Parts |
|---|---|
| Polyester Polyurethane (molecular weight about 30,000 (addition polymerization product of polyester and m-xylylenediisocyanate, the polyester being produced by the condnesation of ethylene glycol and adipic acid; Desmocoll 400, produced by Bayer AG) | 30 |
| Non-drying Oil-modified Alkyd Resin (reaction product of glycerin, terephthalic acid and a synthetic non-drying oil of an oil length of 30%; hydroxyl value of about 130; Burnock DE-180-70, produced by Japan Reichhold Co., Ltd.) | 35 |
| Silicone Oil (dimethylpolysiloxane) | 2 |

The resulting mixture was charged in a ball mill and kneaded for 10 hours. To the mixture was then added 22 parts of an isocyanate (Desmodur L-75, tradename for a 75% by weight ethyl acetate solution of a reaction product between 3 moles of 2,4-tolylene diisocyanate and 1 mole of trimethylol propane; produced by Bayer A.G.), which was subjected to high speed shearing dispersion for 1 hour to produce a magnetic coating composition.

This coating composition was coated on one side of a 25 micron thick polyethylene terephthalate film, while applying a magnetic field, in a thickness of 5 microns, which was then dried by heating. The thus obtained wide magnetic web was supercalender processed and slit to a ½ inch width, whereby video tapes were obtained. The video tapes so obtained had quite excellent surface properties. This sample is designated Sample T-1.

EXAMPLE 2

| Liquid M | |
|---|---|
| Ferrous Chloride | 0.36 M/l |
| Cobalt Chloride | 0.04 M/l |
| Liquid R | |
| NaBH$_4$ (0.01 N NaOH aq. soln.) | 1.6 M/l |

To a non-magneticc vessel was charged 80 parts of the above Liquid M. 20 parts of Liquid R was added to Liquid M with stirring (while applying DC magnetic field so as not to exceed a maximum field strength of 1,000 Oe to the vessel over a period of 10 seconds) to cause reaction therebetween. The temperature at the time that the reaction was started was 20° C, and it increased due to the exothermic reaction. However, the temperature was controlled at 35° C to the peak of the reaction by cooling from the outside. The reaction proceeded very quickly, and the reaction was stopped in 2 minutes after the generation of H$_2$ gas became low. A black magnetic metal powder was obtained.

This powder was separated from the mother liquor. The conductivity of the mother liquor was 60 m$\mu$/cm. The powder was washed with water, and when the conductivity of the water after washing decreased to 10 m$\mu$/cm, the metal powder was treated with water containing 0.1% sodium oleate. The metal powder and the sodium oleate aqueous solution were mixed in a ratio of 1 part of the metal powder to 20 parts of the sodium oleate aqueous solution, and a dispersion of the resulting mixture was formed.

The sodium oleate aqueous solution was removed, and the remaining metal powder was washed with acetone. The acetone was used in an amount of 10 parts, but it was possible to remove water in a short period of time. In this state, a part of the sample was dried in air maintained at 40° C. This sample is designated Sample P-2. The remainder was further replaced with butyl acetate.

Thereafter, in the same manner as in Example 1, a magnetic coating composition was prepared and coated on a 25 micron thick polyethylene terephthalate film to produce a video tape. The thus obtained video tape had excellent surface properties. This sample is designated Sample T-2.

EXAMPLE 3

In the same manner as described in Example 2, a ferromagnetic metal powder was obtained. The metal powder was separated from the mother liquor and washed with water, and when the conductivity reached 1 m$\mu$/cm, the metal powder was washed with water containing 0.1% of sodium stearate. Thereafter, the metal powder was processed in the same manner as in Example 2. The thus obtained powder is designated P-3. And the thus obtained tape is designated T-3.

EXAMPLE 4

The procedure of Example 2 was repeated except that the following compounds were used in place of sodium oleate in the same amount.
A. Potassium Oleate
B. Calcium Oleate
C. Magnesium Oleate The powders obtained are designated, respectively, P-4 (A), P-4 (B), and P-4 (C). The tapes are designated T-4 (A), T-4 (B), and T-4 (C).

EXAMPLE 5

The procedure of Example 2 was repeated except that the following compounds were used in place of sodium oleate in the same amount.
A. Sodium Oleylsulfate
B. Sodium Ziegler-alcohol sulfate
C. Igepon-T (produced by I.G. Farben Industrie)

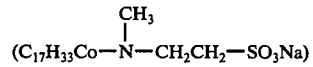

D. Teepol (produced by Shell Chemical Corp.)

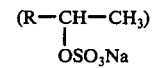

E. Aerosol OT (produced by American Cyanamide Co., sodium di(2-ethylhexyl)sulfosuccinate)

The thus obtained powders are designated, respectively, P-5 (A), P-5 (B), P-5 (C), P-5 (D), and P-5 (E), and the tapes are designated T-5 (A), T-5 (B), T-5 (C), T-5 (D), and T-5 (E), respectively.

COMPARISON EXAMPLE 1

The procedure of Example 1 was repeated except that sodium oleate was not used, and the washing was carried out only with distilled water.

The powder and tape so obtained are designated, respectively, P-1' and T-1'.

COMPARISON EXAMPLE 2

The procedure of Example 2 was repeated except that sodium oleate was not used, and the washing was carried out only with city water.

The powder and tape so obtained are, respectively, designated P-2' and T-2'.

COMPARISON EXAMPLE 3

The procedure of Example 2 was repeated except that after the metal powder was separated from the mother liquor, the metal powder was directly treated with water containing sodium oleate without previously washing with water and in a condition at which the conductivity was 60 m$\mu$/cm.

The powder and tape so obtained are designated P-2" and T-2".

The results of the evaluations of the above examples and comparison examples are shown in Tables 1 and 2.

Table 1

| Sample No. | Saturation Magnetization | $\delta s$ (emu/g)* after Standing at 60° C, and 90% RH for 7 Days |
|---|---|---|
| Examples | | |
| P-1 | 99.2 | 89.8 |
| P-2 | 125.1 | 106.5 |
| P-3 | 115.4 | 96.2 |
| P-4 (A) | 120.5 | 100.8 |
| P-4 (B) | 110.5 | 96.0 |
| P-4 (C) | 108.7 | 96.0 |
| P-5 (A) | 105.0 | 80.5 |
| P-5 (B) | 105.4 | 78.0 |
| P-5 (C) | 110.0 | 91.6 |
| P-5 (D) | 111.7 | 90.6 |
| P-5 (E) | 109.5 | 86.2 |
| Comparison Examples | | |
| P-1' | 96.0 | 84.5 |
| P-2' | 102.0 | 50.0 |
| P-2" | 87.5 | 75.9 |

*Measured at a magnetic field of Hm = 4,000 Oe

Table 2

| Sample No. | HC (Oe)** | Br/Bm** |
|---|---|---|
| Examples | | |
| T-1 | 1,800 | 0.81 |
| T-2 | 1,100 | 0.83 |
| T-3 | 1,100 | 0.82 |
| T-4 (A) | 1,100 | 0.82 |
| T-4 (B) | 1,100 | 0.81 |
| T-4 (C) | 1,150 | 0.81 |
| T-5 (A) | 1,100 | 0.81 |
| T-5 (B) | 1,100 | 0.81 |
| T-5 (C) | 1,100 | 0.81 |
| T-5 (D) | 1,100 | 0.81 |
| T-5 (E) | 1,100 | 0.81 |
| Comparison Example | | |
| T-1' | 1,800 | 0.80 |
| T-2' | 1,100 | 0.81 |
| T-2" | 1,100 | 0.81 |

**T-1 and T-1' were measured at a magnetic field of Hm = 4,000 Oe, and the other samples were measured at a magnetic field of Hm = 2,000.

It can be understood from the results shown in Table 1 and 2 above that the application of the method of the present invention, i.e., the treatment of a ferromagnetic metal powder with an aqueous solution containing an anionic surface active agent or agents, enables the saturation magnetization of the powder to be increased the saturation magnetization after standing under the conditions of 60° C and 90% RH to be improved.

Moreover, it can be understood that Sample P-2" had a poor $\sigma_s$, but had excellent resistance to oxidation. The reason for this is considered to be due to the influence of unreacted metal ions and anions such as Cl$^-$ and the like remaining on the metal powder because the surface active agent was added before the conductivity was reduced. With regard to the high resistance to oxidation, it is considered that the adsorption of the surface active agent contributes thereto.

On the other hand, with those tapes produced using these metal powders, no deterioration of magnetic properties, i.e., Hc and Br/Bm, was observed, and it can be understood that the squareness ratio (Br/Bm) increased due to an increase in the dispersibility.

EXAMPLE 6

The procedure of Example 2 was repeated except that Liquid M and Liquid R were changed as follows:

| Liquid M | |
|---|---|
| Ferrous Chloride | 0.695 M/l |
| Cobalt Chloride | 0.285 M/l |
| CrCl$_3$ . 6H$_2$O | 0.02 M/l |
| Liquid R | |
| NaBH$_4$ (0.01 N NaOH aq. soln.) | 3.5 M/l |

The thus obtained metal powder had a $\delta s$ of 125 emu/g. After standing under the conditions of 60° C and 90% RH for 7 days, the $\delta s$ of the ferromagnetic metal powder was measured, and it was found to be 110 emu/g. The particle size of this powder was about 350 Å in the direction of the minor axis, i.e., the width of the chain-like particles. On analysis this powder was found to be 57.0% by weight Fe, 23.9% by weight Co, 3.6% by weight Cr, and 3.9% by weight B. Moreover, the surface of this powder was quite hydrophobic.

COMPARISON EXAMPLE 4

The procedure of Example 2 was repeated except that sodium oleate was previously added to Liquid M in a proportion of 0.004 M/l.

The reaction product so obtained was then washed with water and subjected to solvent-replacement in a conventional manner, whereby a powder was obtained.

This powder had a $\delta s$ of 92 emu/g, and after standing under the conditions of 60° C and 90% RH, the $\delta s$ was 80.7 emu/g.

Using the thus obtained powder, a tape was produced in the same manner as in Example 1, and the Hc was 750 Oe and the Br/Bm was 0.78 Br/Bm.

The ferromagnetic metal powder produced by the above method in which the anionic surface agent was previously added to the reaction bath had a lower Hc and Br/Bm than that produced by the method of the present invention.

EXAMPLE 7

The procedure of Example 6 was repeated except that dimethylformamide was used in place of the 0.01 N NaOH aqueous solution (Liquid R) and a magnetic field was applied.

The powder so obtained was black, and the powder particles were uniformly spherical having a diameter of 50 Å. The powder had a $\delta s$ of 100 emu/g. After standing under the conditions of 60° C and 90% RH, the δs was 80 emu/g. If the powder was not treated with sodium oleate, the δs was 45 emu/g. Thus, it has been found that the effect of the present invention can be attained in the treatment of fine powders. The powder had an Hc of 20 Oe. This powder can be used as a magnetic powder for a magnetic fluid and the like.

COMPARISON EXAMPLE 5

In Example 2, the washing was carried out only with city water and without sodium oleate. Then, likewise, acetone processing and drying were conducted. Then, 1 part of the powder, 0.05 parts of sodium oleate, and 20 parts of toluene were added and dispersed in a ball mill.

This powder had a δs of 98 emu/g and a δs of 73.9 emu/g after standing under the conditions of 60° C and 90% RH for 7 days.

While the invention has been described in detail and with reference to specific embodiments thereof, it will be apparent to one skilled in the art that various changes and modifications can be made therein without departing from the spirit and scope thereof.

What is claimed is:

1. In a process for producing a ferromagnetic metal powder by reducing, in a solution, a salt of a metal capable of forming a ferromagnetic metal powder with a reducing agent, the improvement comprising separating the ferromagnetic powder from the reaction bath, washing the ferromagnetic metal powder with water until the conductivity of the water after the washing is about 50 mυ/cm or less, and then treating said ferromagnetic metal powder with an aqueous solution containing at least one anionic surface active agent.

2. The process according to claim 1, wherein the anionic surface active agent is an aliphatic carboxylate salt.

3. The process according to claim 1, wherein the anionic surface active agent is the alkali metal salt of an aliphatic carboxylic acid containing 11 to 18 carbon atoms.

4. The process according to claim 3, wherein the aliphatic acid is an unsaturated aliphatic carboxylic acid.

5. The process according to claim 4, wherein the alkali metal salt of the unsaturated aliphatic carboxylic acid is sodium oleate.

6. The process according to claim 1, wherein the solution reduction process is carried out using an acid or salt of a phosphinic acid as the reducing agent.

7. The process according to claim 1, wherein the solution reduction is carried out using a boron hydride compound or a derivative thereof as the reducing agent.

8. The process according to claim 1, wherein the ferromagnetic metal powder comprises at least about 75% by weight of the metal, and wherein the ferromagnetic metal comprises a member selected from group consisting Fe, Co, Ni, and combinations thereof.

9. The process according to claim 8, wherein the ferromagnetic metal powder further contains about 20% by weight of a non-magnetic metal selected from the group consisting of Al, Si, S, Sc, Ti, Vi, Cr, Mn, Zn, Y, Mo, Rh, Pd, Ag, Sn, Sb, Te, Ba, Ta, W, Re, Au, Hg, Pb, Bi, La, Ce, Pr, Nd, B, P and combinations thereof.

10. The process according to claim 8 wherein the ferromagnetic metal powder further contains 15% by weight or less of a member selected from the group consisting of water, oxygen, hydroxyl groups, or combinations thereof.

11. A ferromagnetic metal powder comprising at least about 75% by weight of a ferromagnetic metal selected from the group consisting of Fe, Co, Ni and combinations thereof; about 20% by weight of a nonmagnetic metal selected from the group consisting of Al, Si, S, Sc, Ti, Vi, Cr, Mn, Zn, Y, Mo, Rh, Pd, Ag, Sn, Sb, Te, Ba, Ta, W, Re, Au, Hg, Pb, Bi, La, Ce, Pr, Nd, B, P and combinations thereof; and 15% by weight or less of a member selected from the group consisting of water, oxygen, hydroxyl groups, and combinations thereof; said ferromagnetic metal powder being produced by reducing, in a solution, a salt of said metal capable of forming a ferromagnetic metal powder and a salt of said non-magnetic metal with a reducing agent, and separating the ferromagnetic powder from the reaction bath, washing the ferromagnetic powder with water until the conductivity of the water after the washing is 50 m μ/cm or less, and then treating said ferromagnetic metal powder with an aqueous solution containing at least one anionic surface active agent.

12. A magnetic recording member comprising a support having thereon a magnetic recording layer comprising the ferromagnetic powder of claim 11 in a binder.

13. A ferromagnetic metal powder comprising at least 75% by weight of Co and about 25% by weight or less of P and a member selected from the group consisting of Ni, Cr, Ti, Pb, Sn, Sb, S, Pd and combinations thereof, and about 10% by weight or less of at least one member selected from the group consisting of water, oxygen, hydroxyl groups, and combinations thereof; said ferromagnetic metal powder being produced by reducing a solution containing a metal capable of forming a ferromagnetic powder with phosphinic acid or a salt thereof, separating the ferromagnetic powder from the reaction bath, washing the ferromagnetic powder with water until the conductivity of the water after the washing is about 50 m μ/cm or less, and then treating said ferromagnetic metal powder with an aqueous solution containing at least one anionic surface active agent.

14. A ferromagnetic metal powder comprising at least 75% by weight Fe, about 25% by weight or less of B and a member selected from the group consisting of Co, Ni, Cr, Ti, Pb, Sn, Sb, S and combinations thereof, and about 10% by weight or less of a member selected from the group consisting of water, oxygen, hydroxyl groups and combinations thereof, said ferromagnetic metal powder being produced by reducing in a solution a salt of a metal capable of forming a ferromagnetic metal powder with a boron hydride compound or a derivative thereof, separating the ferromagnetic metal powder from the reaction bath, washing the ferromagnetic powder with water until the conductivity of the water after the washing is about 50 mμ/cm or less, and then treating said ferromagnetic metal powder with an aqueous solution containing at least one anionic surface active agent.

* * * * *